United States Patent

[11] 3,570,675

| [72] | Inventors | David B. Pall |
| | | Roslyn Estates; |
| | | Tadas K. Jasaitis, Great Neck, N.Y. |
| [21] | Appl. No. | 607,478 |
| [22] | Filed | Jan. 5, 1967 |
| [45] | Patented | Mar. 16, 1971 |
| [73] | Assignee | Pall Corporation |
| | | Glen Cove, N.Y. |
| | | Continuation-in-part of application Ser. No. 544,788, June 2, 1966, now abandoned. |

[54] BACK PRESSURE RESISTANT FILTER ELEMENT
18 Claims, 4 Drawing Figs.

[52] U.S. Cl. .................................................. 210/457,
210/490, 210/493
[51] Int. Cl. ................................................... B01d 27/06
[50] Field of Search ........................................... 210/457,
493, 493 (B), 490; 55/498, 500, 521, 524

[56] References Cited
UNITED STATES PATENTS

| 2,395,449 | 2/1946 | Briggs | 210/493X |
| 2,749,265 | 6/1956 | Fricke et al. | 210/493X |
| 3,246,765 | 4/1966 | Murphy et al. | 210/493X |
| 3,246,766 | 4/1966 | Pall | 210/457 |
| 3,246,767 | 4/1966 | Pall et al. | 210/505 |
| 3,283,904 | 11/1966 | Buckman et al. | 210/493X |
| 3,407,252 | 10/1968 | Pall et al. | 210/493X |

FOREIGN PATENTS

| 1,177,351 | 12/1958 | France | 210/493 |

*Primary Examiner*—Reuben Friedman
*Assistant Examiner*—C.M. Ditlow
*Attorney*—Janes & Chapman ABSTRACT: A corrugated cylindrical filter element is disposed about a central core. A perforated plastic bonding sheet is disposed between the core and the filter. The bonding sheet is bonded in situ to the inner tips of the corrugations only.

PATENTED MAR 16 1971

PATENTED MAR 16 1971 3,570,675

BACK PRESSURE RESISTANT FILTER ELEMENT

This application is a continuation in part of U.S. Pat. application Ser. No. 544,788, filed Jun. 2, 1966, now abandoned.

This invention relates to a corrugated filter element that is resistant to deformation under back pressure, and more particularly, it relates to a corrugated filter element whose corrugations are fixed in position to improve resistance to deforming back pressure.

High pressures normally develop on the upstream side of a filter, and the magnitude of the pressure differential across the filter element depends upon the number and size of the pores of the filter element, and the extent of clogging. If the pressure differential becomes high enough, the filter can collapse, and corrugated filter elements especially are subject to collapse, because of the corrugations. Hence, supporting members or cores are provided downstream of the filter element to help prevent collapse of the corrugations of the element and of the element itself due to this pressure differential. Such supports are made of relatively rigid materials that can provide support for both the filter element and the end cap.

In the event of a high back pressure, or a sudden decrease in pressure occurring on the upstream side of the filter element, the element can also collapse in the other direction. Hence, a support frequently must be provided on the other side of element as well. This support commonly takes the form of a tube support which encloses the filter element. However, this support poses several problems, and is not always practical. It increases the volume of the assembly package considerably. It also reduces the available volume for collection of contaminants on the outside of the filter, and it tends to increase the pressure differential across the filter element.

Collapse is a particularly acute problem with corrugated filter elements supported only by internal cores. In such a filter element, there is often an exceptional degree of flexibility, since each corrugation can act as a flex unit. Thus, a good deal of distortion or displacement of the element at a relatively low pressure can take place. It has been found that deformation of such a corrugated filter element can take place with back pressures of as little as 2 p.s.i. Further, at higher pressures, ripping and other severe damage to the filter element can occur.

A filter assembly typical of the prior art is shown by Murphy et al., U.S. Pat. No. 3,246,765. Murphy shows an inside-out filter cartridge in which the corrugated filter element is enclosed within two concentric foraminous tubes. The corrugated element is also held in position by a plurality of adhesive strips, disposed between the upstream support tube and the filter element. The filter element has the undesirable feature that a substantial amount of filter area is blocked by the foraminous upstream support, and further, the adhesive strips both block area on the filter and close off a substantial number of apertures in the foraminous upstream support. Moreover, the adhesive strips shown by Murphy must be applied by hand, and therefore involve a time-consuming and costly assembly.

Another known filter assembly is shown by Fricke et al., in U.S. Pat. No. 2,749,265. Fricke et al. show a corrugated filter sheet bonded to a foraminous core by cement that is applied to the core as a layer of sheet cement. Fricke et al. disclose no perforations or holes in this sheet cement, but apparently Fricke et al. intended the sheet to disintegrate when heated, as can be seen by reference to FIG. 7 of the Fricke et al. patent.

In certain instances, it has been found to be advantageous to use a thermoplastic core such as a polypropylene core. Such a core can be used to particular advantage when a polypropylene end cap is bonded thereto to seal the end of the filter sheet, since the two polypropylene members adhere quite well to each other. However, the use of a polypropylene core can present a problem if the filter sheet is bonded to the core via a thermoplastic cement, as in the Fricke et al. patent. The temperatures needed to soften the bonding agent can, since the core is thermoplastic, also soften, deform, or damage the core. Similarly, this same problem is presented if a core that is soluble in a particular solvent is used, and the filter sheet is bonded to the core by the use of a bonding agent that is also soluble in this solvent. The use of such a solvent will naturally cause softening or dissolution of the core as well as the bonding agent.

The instant invention provides a highly rigid corrugated filter element which can withstand a back pressure differential in excess of 25 p.s.i. Resistance to back pressure is provided without substantial increase in the pressure drop across the filter element, and resistance to upstream pressure is also increased. Thus, the possibility of deformation and/or tearing of the element even under unusually high pressure differentials across the filter element in either direction is greatly reduced.

The filter element according to the instant invention comprises, in combination, a support core having a plurality of apertures for the passage of fluid therethrough; a corrugated filter sheet formed in a closed configuration extending about the core, the corrugations extending longitudinally of the core, and the inner tips of the corrugations being disposed in proximity to the core; and a foraminous bonding sheet disposed between the core and the filter sheet, and bonded only to the inner tips of the corrugations of the filter sheet to fix the inner tips of the corrugation against displacement.

The instant invention also provides a method for making such a filter element, which comprises disposing a foraminous bonding sheet on a temporary support which is not affected by the method or means of bonding used; disposing the corrugated filter sheet on the temporary support and in contact with the foraminous bonding sheet, such that substantially each corrugation is in contact with a portion of the sheet; bonding the tips of the corrugations of the filter sheet to the bonding sheet to fix said tips in position; and replacing the temporary support with a permanent support.

Figure 1:
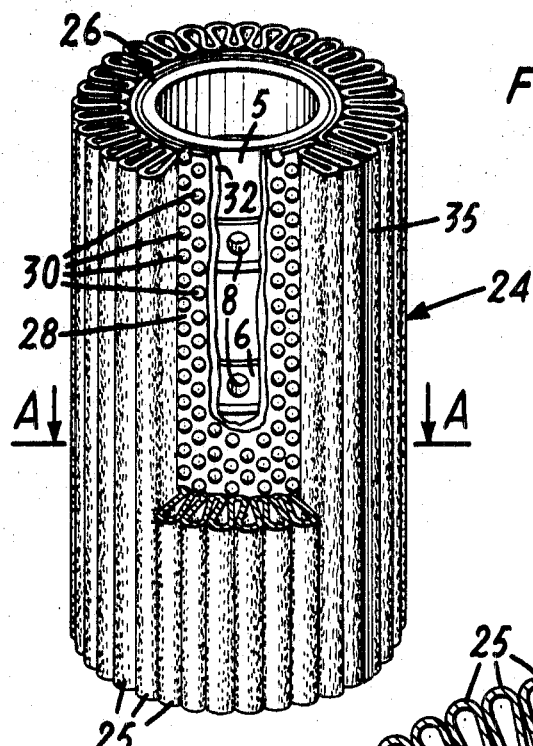
FIG. 1 is a view in perspective and partially broken away of a filter element of the instant invention.

To form the instant filter element, first a temporary support member is selected. The temporary support acts as a mandrel for the corrugated filter sheet and serves to support the filter sheet during the bonding operation. In the completed assembly, it is replaced by the permanent support normally in the form of a core.

Since the temporary support is the support member for the assembly during the bonding of the filter sheet to the foraminous bonding sheet, it should be made of a material that is not affected by the method or means of bonding to be used. That is, for example, if heat is used to bond the filter sheet to the bonding sheet, the temporary support could be made of a ceramic material, a metal, or any other relatively nonheat sensitive material. If bonding of the filter sheet to the foraminous bonding sheet is accomplished by the use of a solvent, the core should be made of a material not sensitive to the particular solvent used.

The temporary support normally is relatively rigid, and is shaped to fit within the filter sheet.

Since tubular corrugated filter sheets having tubular permanent cores are preferred, tubular temporary supports are also preferred. However, the temporary support could also be a solid cylindrical rod, a helix, or a rod having a plurality of arms or rings extending radially therefrom. The configuration of the support is not critical to the invention, as long as it is such that it supports the filter sheet during the bonding operation.

When the temporary support is replaced by the permanent one, it is normally removed from within the filter sheet by forcing it axially from its position. However, it is also possible to provide a support that expands within the tubular filter sheet to support the sheet. Such a support could be contracted or collapsed to remove it from within the filter sheet. The temporary support could be inflatable, or expandable by a mechanical screw-type mechanism. To remove such a support from the filter sheet, it need only be deflated, or the screw mechanism reversed.

After the temporary support has been selected, the foraminous bonding sheet is disposed thereon and the corrugated filter sheet is placed on the foraminous bonding sheet.

The foraminous bonding sheet should generally be made of plastic material, cut to dimensions that yield a cylinder having a length equal to the corrugated filter sheet and having a circumference slightly larger than the exterior surface of the core. It can be disposed on the temporary support by folding it longitudinally over the support. It need not be formed from one continuous sheet but could comprise a sheet formed in several sections.

It is also possible to wrap the sheet in a helical manner around the temporary support. The ends of the sheet, which protrude, can be cut off.

The foraminous bonding sheet should have an open area from about 10 to about 30 percent. The holes or apertures in the sheet should be in the range from about 0.03 inch to about 0.1 inch in diameter, and from 0.035 to 0.05 inch is preferred.

The thickness of the sheet should be within the range from about 0.005 inch to 0.05 inch, and from 0.012 inch to 0.01 inch is preferred. The thickness, however, is dependent upon the material used for the sheet. The sheet should be thick enough that it will form a bond between each corrugation and the next, and thin enough to be easily handled by an operator.

The foraminous bonding sheet can be in the form of a plastic mesh, plastic cloth, porous plastic sheet, or a perforated plastic sheet.

The bonding sheet can be made of a thermoplastic material such as polypropylene, and this is preferred. Other suitable thermoplastic materials that can be used as the bonding sheet are polyethylene, polyoxymethylene, polyisobutylene, polyamides, cellulose acetate, ethyl cellulose, copolymers of vinyl chloride and vinyl acetate, polyvinyl chloride polyvinylidene chloride, polyvinyl butyral, nylon, polytetrafluoroethylene, polystyrene, polytrifluorochloroethylene, ligninsulfonate resins, terpene resins, polyacrylic resins, such as polymethyl methacrylate, alykd resins, and synthetic rubbers such as butadiene-styrene polymers.

The foraminous sheet can also be of a plastic that can be softened by a solvent. Typical plastic materials which are softened by solvents and can be used as the bonding sheet are polyvinyl chloride, polyvinyl acetate, ester gum, polymethyl methacrylate and polystyrene, that are soluble in acetone, and acetonyl acetone. Other soluble plastic materials that can be used are rubber hydrochloride, starch binders, casein binders, camphor gum, casein glues, polyvinylidene chloride, and copolymers of vinyl chloride and vinyl acetate, that are soluble in amyl acetate.

It has been found advantageous to interpose a separator sheet of paper or the like between the plastic bonding sheet and the temporary support. This facilitates the later removal of the temporary support, and prevents the bonding sheet from adhering thereto. This sheet need not be paper, but could be of any porous or foraminous sheet material that will prevent the adhesion of the foraminous bonding sheet and the temporary support member. It is also possible to prevent the adhesion of the foraminous bonding sheet to the support by providing a coated support. Such a support could be coated with materials such as polytetrafluoroethylene and polytrifluorochloroethylene.

The corrugated filter element is then disposed on or around the foraminous bonding sheet and the temporary support member with the corrugations extending longitudinally of the core, and the inner tips thereof adjacent to the core.

The corrugated filter sheet of the instant element can comprise any of the filter sheets known to those skilled in the art, and can be made from any filter medium. Fibrous filter sheets made of materials such as paper, asbestos, paper-asbestos combinations, textile fibers, regenerated cellulose, microcrystalline cellulose, casein fibers, zein fibers, cellulose acetate viscose rayon, hemp, jute, linen, cotton, silk, wool, mohair, glass, polyvinyl chloride, polystyrene, polyethylene, polypropylene, and polyacrylonitrile are generally preferred. A fibrous filter sheet can be woven, or it can be nonwoven, such as a felt, mat or bat. The media can also comprise a plurality of woven and/or nonwoven layers, and can be resin-impregnated.

The filter sheet can also comprise a fibrous or nonfibrous base upon which a fibrous and/or particulate layer is laid down. Preferable examples are disclosed in U.S. Pat. Nos. 3,246,767 to Pall et al., and 3,238,056 to Pall. Other filter media, such as wire meshes or stainless steel, sintered stainless steel, brass, Monel, iron, copper, aluminum, and plastic can be used. These can have a fibrous or particulate material bonded thereto. Examples of a suitable metallic filter element are disclosed in U.S. Pat. Nos. 2,925,650 to Pall and 3,241,681 to Pall.

The filter sheet is corrugated and is formed in a closed configuration as a corrugated tube. Pressure can then be applied to the package, for example, by mechanical springs, bands, weights and the like, or manually. The application of pressure ensures that the inner tips of the corrugations become embedded into and firmly affixed to the foraminous bonding sheet during bonding to ensure a good bond between each corrugation and the sheet. The side seam of the filter sheet can then be sealed and composite is ready for bonding of the corrugated filter sheet to the foraminous bonding sheet.

The foraminous bonding sheet in the completed assembly bonds the corrugations of the filter sheet in a fixed relation to each other. By forming such a bond, the filter element is given lateral support. This is due to the fact that substantially each corrugation in this assembly is bonded to the next, and held in a fixed relation thereto. Thus, each corrugation can no longer flex away from the next, and the periphery of the filter element therefore has a fixed circumference. Thus, should back pressures occur, the filter sheet can no longer flex away from the core. Therefore, pressures which might normally tend to distort or deform the filter element away from the core cannot do so.

The corrugated filter sheet is now ready to be bonded to the bonding sheet and bonding is carried out in a manner appropriate to the bonding sheet used. For example, if the bonding sheet is made of a thermoplastic material, the assembly of the temporary support, the foraminous bonding sheet, and the filter element can be subjected to an elevated temperature appropriate to melt the plastic. This causes the sheet to soften and the corrugation tips become embedded therein. When the bonding sheet cools, the corrugations of the filter sheet are bonded to the sheet such that each corrugation is fixed relative to the next, in a continuous manner across the corrugations and along the length of the sheet.

The temperature to which a thermoplastic or thermosetting bonding sheet is exposed is determined by the particular plastic used; the softening points and curing temperatures are well known to those skilled in the art. The material should not be melted except at the surface, since there otherwise is danger of disintegration.

If a plastic bonding sheet softened by a solvent is used, the entire assembly of the temporary support, the bonding sheet and the filter sheet can be immersed in a solvent bath. The plastic sheet is softened thereby, and the corrugation tips become imbedded therein. When the solvent evaporates, the bonding sheet hardens, and it bonds the corrugations of the filter element together in the manner described above.

It is to be noted that in the practice of the instant invention, it is also possible to seal the side seam of the filter sheet simultaneously with the bonding of the corrugations to the sheet to the foraminous bonding. For example, the foraminous plastic sheet can be made of a sufficient length such that a portion of the sheet extends radially away from the core when the sheet is wrapped around it.

The extra length can be folded into one or two longitudinal border strips which extend radially away from the core. These border strips can be inserted between the side edges of the corrugated filter sheet to form the side seam. When pressure is applied and the appropriate bonding procedure is completed, e.g., heating, the side seam of the filter element is sealed and the corrugations of the filter element are bonded in a fixed relation to each other.

This provides a simple method for producing an exceptionally strong filter assembly, that resists both back pressures and forward pressures.

In other embodiments of this invention, the side seam of a corrugated filter sheet can also be sealed by applying a strip or layer of a bonding agent such as a thermosetting resin, a resin cured by a curing agent, liquid or semisolid thermoplastic material and the like between side edges of the filter sheet.

Typical bonding materials that can be used to bond the side seam are polyvinyl chloride, polyvinylidene chloride, polyvinyl butyrol, polyacrylonitrile, polyethylene, polypropylene, rubber hydrochloride, polymers of terphthalic acid and ethylene glycol, polyamides, cellulose acetate, ethyl cellulose, polyesters, polyepoxides, polystyrene, polyisobutylene, urea-formaldehyde, phenol-formaldehyde, and melamine-formaldehyde.

By using the same of a similar bonding agent as both the bonding sheet to and the bonding agent for the side seam, valuable time can be saved in the manufacture of the filter element. For example, if the corrugations are bonded together by disposing a thermoplastic foraminous sheet about the core, a thermosetting resin can be disposed along the side seam of the filter sheet. When heat and pressure are applied to the package, curing of the resin takes place. The filter sheet thus is sealed along its side seam and when the thermoplastic sheet cools, its corrugations are bonded together.

When the sheet undergoes solidification by cooling, evaporation of a solvent, polymerization, cross-linking or the like, the temporary support is replaced by the permanent support core. This can readily be accomplished since the temporary support is not bonded to the corrugated filter sheet.

The selection of the core and the material used therefor need not be dependent upon the method or agent used to bond the core to the filter element, since in the instant filter element the corrugated filter sheet is not bonded to the core. This is due to the fact that the core is not placed within the filter element until the bonding operation is completed. Thus, a core that is sensitive to the method of bonding can be used.

In the preferred embodiment of this invention, the core is made of polypropylene. Such a core will provide excellent adhesion to polypropylene end caps.

The core of the instant filter assembly generally can be of any material, including metals such as aluminum, magnesium, stainless steel, steel, brass, iron, and alloys including these, and the like. Ceramic cores and polycarbonate cores can also be used. Plastic cores made of other materials such as polyvinyl chloride, polypropylene, polyethylene, phenol-formaldehyde, urea-formaldehyde, polystyrene, nylon, polytetrafluoroethylene, and the like are also suitable for use in the instant filter assembly. The material used for the core and its thickness will be selected by reference to the strength needed to withstand the pressures encountered in a particular fluid system.

The core should preferably be strong enough to be used to force the temporary support from the filter element.

The permanent support core is preferably generally tubular in shape. However, it can be formed in any shape desired. All that is necessary is that the core fit within or around the filter element and have an open interior passage of fluid therethrough.

The core can be formed with a smooth surface or it can be formed with a plurality of circumferential alternately raised and depressed portions along its length. These portions can be defined by a series of circumferential grooves or circumferential troughlike indentations in the surface of the core. The distance between one raised portion and the next preferably should not exceed two inches. This configuration facilitates the passage of fluid through the filter element since it reduces the amount of filter area blocked by the core and provides flow paths for the fluid.

The core has a plurality of holes therethrough, well distributed along its length, in sufficient number to permit the passage of fluid from the filter element through the core. The number and size of the holes are determined by the acceptable pressure drop through the filter element. These, in the preferred embodiment, are disposed in the depressed portions of the core. This construction facilitates the passage of fluid through the core. The higher the acceptable pressure drop, the fewer the number of and the smaller the holes that need be provided.

To remove the temporary support and replace it with the permanent core, the permanent core can be placed with its butt end against the temporary support and forced axially against it. This forces the temporary support outwardly from the tubular corrugated sheet, and replaces it with the permanent support. This can be accomplished manually, pneumatically, or by any other means known to those skilled in the art. It has been found advantageous to use a guide, such as a centering piece or boss to facilitate the removal of the temporary support member and the insertion of the permanent core into position.

Naturally, if a permanent support that is deflatable, or contractable is used, the temporary support need not be forced from the assembly but can be merely removed and replaced by the permanent support core.

When the temporary support is removed, and the permanent support core has replaced it, the filter element is completed.

If heat bonding is used, the permanent core can be introduced into the assembly before the filter assembly becomes completely cooled. In such a case, after the permanent core is introduced and the assembly cools further, the bonding sheet will contract and tightly grip the permanent core.

The corrugations of the completed filter element are embedded into the bonding sheet and held thereby in a fixed relation to each other, such that they no longer are free to flex relative to each other. Thus, they will not be able to move away or be displaced away from the core, and the completed element will resist back pressures. However, since the corrugations of the filter sheet are not bonded to the permanent core and since it is not exposed to the method of bonding or the bonding agent used, the permanent core can be of any desired material.

Figure 2:
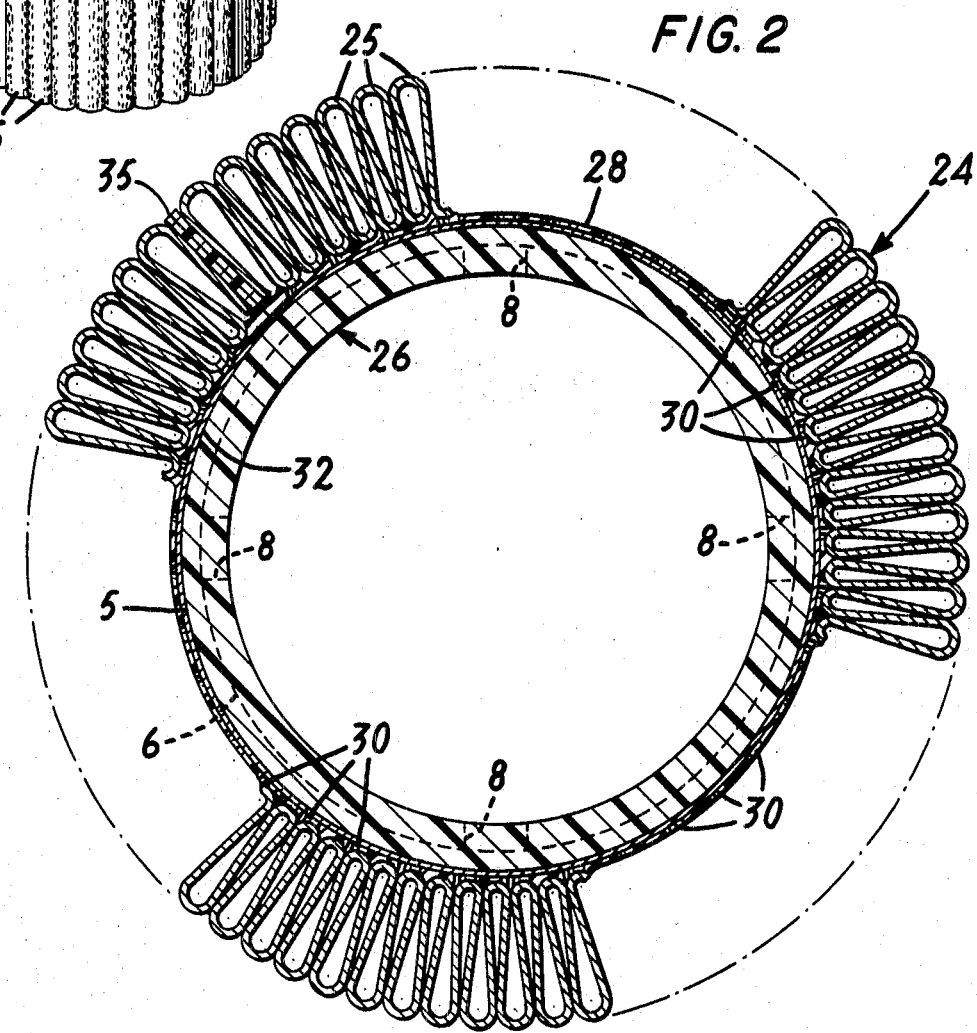
FIG. 2 is an enlarged view in section, take along the line A—A of FIG. 1.
Figure 3:
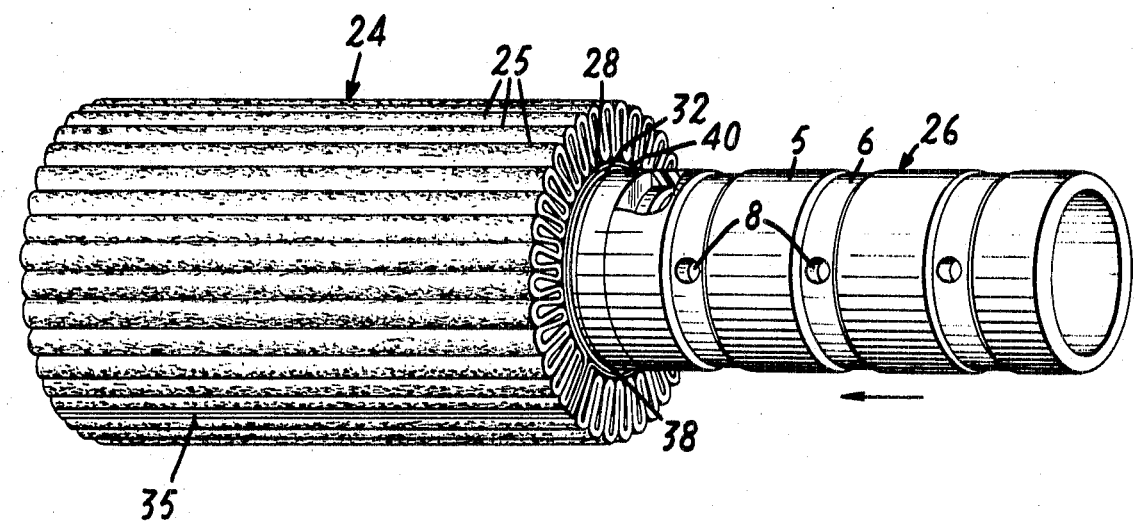
FIG. 3 is a view in perspective of a just completed filter element with the temporary support member still in position.
Figure 4:
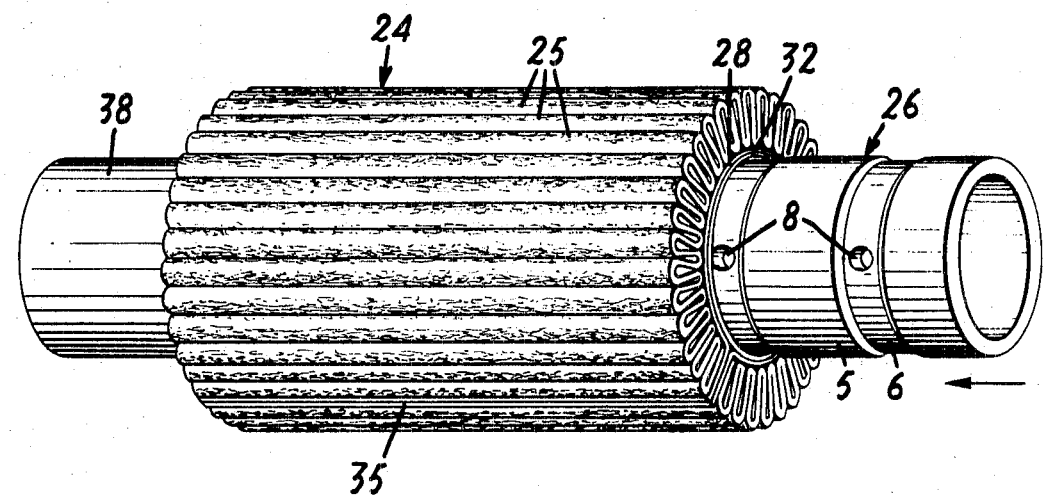
FIG. 4 is a view in perspective of a filter element in which the temporary support member has been partially removed.

The preferred embodiment of the invention is shown in FIG. 1 and comprises a tubular filter sheet 24 composed of a porous paper base and a microporous layer of fibrous material adhered thereto formed into a plurality of corrugations 25. A polypropylene core 26 is disposed through this filter sheet. The polypropylene core is formed with alternately raised and depressed portions 5 and 6, respectively. A plurality of apertures 8 are disposed in the depressed portions to permit the passage of fluid from the filter element through the core. The core is cylindrical and is similar in shape to that shown in U.S. Pat. No. 3,246,766, but is formed in one piece. Disposed between the polypropylene core 26 and the filter sheet is a foraminous thermoplastic polypropylene bonding sheet 28, having a multiplicity of holes 30 of about 0.030 inch in diameter therethrough. This sheet bonds each corrugation of the filter sheet 24 to the next. This plastic bonding sheet is approximately 0.010 inch thick and has about 30 percent of its area open. A sheet of filter paper 32 is disposed between this polypropylene bonding sheet 28 and the polypropylene core 26. This sheet of filter paper can best be seen by reference to FIG. 2.

The length of this bonding sheet is equal to the length of the core, and when folded its circumference exceeds the circumference of the core by about twice the height of a corrugation. This excess length is folded away from the core into two border strips 35 that extend radially away from the core. The corrugated filter sheet 24 is disposed about the core over the bonding sheet such that the extending border strips 35 of the sheet 28 project between the free side edges of the corrugated pack. This can best be seen by reference to FIG. 2. These border strips bond the free edges of the filter element together to form the side seam.

The filter element is formed by initially selecting a mandrel or temporary support member 38. In the preferred embodiment, the mandrel is made of stainless steel. A sheet of paper 32 is then disposed around this temporary support. The foraminous thermoplastic bonding sheet 28 is then folded about the core and the border strips 35 are folded to extend radially away from the temporary support. These strips are disposed along the side seam of the filter element to seal it. The corrugated filter sheet 24 is then disposed about the temporary support and over the foraminous sheet. The extending border strips of the foraminous sheet are disposed to protrude between the free side edges of the filter sheet. Springs are then placed around the outer periphery of the corrugated sheet 24 to press the corrugated sheet against the core.

The composite is then heated in an oven to a temperature of about 350° F. to 400° F. for about 35 to 45 minutes until the thermoplastic polypropylene sheet is softened and the inner tips of the corrugations become embedded therein. The filter composite is then removed from the oven and allowed to cool.

Just before the element completely cools, a boss or guide member 40 made of steel is placed against the end of the temporary support core. This boss or guide is of the same circumference as the temporary support and has portions that are adapted to fit within the support. This guide fits against the permanent core to guide the core into position in the corrugated filter sheet. The polypropylene core 26 is placed on the other end of the guide piece 40 and pressure is applied to the end of the core. The temporary support 38 is forced from the filter element, and the permanent core 26 replaces it.

As the composite filter element cools further, the polypropylene foraminous sheet solidifies and contracts. This contraction causes it to tightly engage the permanent core and form a very rigid filter element. Since each corrugation is no longer free to flex relative to the next corrugation, the corrugated filter sheet is not able to move away from the core and the element resists back pressures.

We claim:

1. A filter element comprising, in combination a support core having a plurality of apertures for the passage of fluid therethrough; a corrugated filter sheet formed in a closed configuration extending about the core, with the corrugations extending longitudinally of the core, and the inner tips of the corrugations being disposed in proximity to the core; and a foraminous softenable plastic bonding sheet disposed between the core and the filter sheet and bonded only to the inner tips of corrugations of the filter sheet, the inner tips of the corrugations being bonded in situ to the bonding sheet by displacement of the plastic material about at least a portion of the inner tips of the corrugations with the corrugations disposed about a central axis in a fixed radial relationship to each other and with the inner tips of the corrugations being fixed against displacement.

2. A filter element in accordance with claim 1, in which the foraminous bonding sheet is made of thermoplastic material.

3. A filter element in accordance with claim 1, in which the bonding sheet is made of polypropylene.

4. A filter element in accordance with claim 1, in which the bonding sheet has up to about 30 percent open area.

5. A filter element in accordance with claim 1, in which the core is made of a thermoplastic material.

6. A filter element in accordance with claim 5, in which the core is made of polypropylene.

7. A filter element in accordance with claim 1, in which the core has a series of circumferential troughlike indentations.

8. A filter element in accordance with claim 1, in which the corrugated filter sheet is made of paper.

9. A filter element in accordance with claim 1, in which the filter sheet is made from a material that comprises a porous base having a microporous layer adhered thereto.

10. A filter element in accordance with claim 1, in which the side edge portions of the corrugated filter sheet are positioned in a juxtaposed relationship and in which a portion of the bonding sheet is positioned between said side edge portions so as to bond the side edges to each other and thereby form a side seam.

11. A filter element in accordance with claim 10, in which the side edge portions are bonded to each other by a radially extending border strip of the bonding sheet.

12. A filter element in accordance with claim 1, including a sheet of separating material, disposed between the core and the foraminous bonding sheet.

13. A filter element in accordance with claim 12, in which the separating material is paper.

14. A filter element in accordance with claim 1, in which the foraminous bonding sheet is soluble in a solvent, and the core is soluble in the same solvent.

15. A filter element comprising, in combination, a generally tubular thermoplastic support core having a series of circumferential indentations along its length, and having a plurality of apertures disposed in the indentations for the passage of fluid therethrough; a separator sheet disposed about the core; a corrugated filter sheet formed in a generally tubular closed configuration, disposed concentrically on the core over the separator sheet, the corrugations of said filter sheet extending longitudinally of the core and the inner tips of the corrugations being disposed in proximity to the core; and a foraminous thermoplastic bonding sheet disposed between the separating sheet and the filter sheet, said bonding sheet being bonded to the inner tips of the corrugations to fix them in position, but not being bonded to the core, such that the corrugated filter sheet cannot flex away from the core, although it is not bonded to the core.

16. A filter element in accordance with claim 15, in which the side edge portions of the corrugated filter sheet are positioned in a juxtaposed relationship, and in which a portion of the foraminous bonding sheet is positioned between the side edge portions so as to bond the side edge portions to each other in a side seam.

17. A filter element in accordance with claim 15, in which the thermoplastic core and the thermoplastic bonding sheet are made of polypropylene.

18. A filter element in accordance with claim 1, in which the foraminous softenable plastic bonding sheet is a perforated sheet.